United States Patent Office 3,419,341
Patented Dec. 31, 1968

3,419,341
POWDERS AND PASTES OF METALLISABLE
DYESTUFFS
Georges Kopp, Mont-Saint-Aignan, and Rene Raymond Julien Vittecoq, Oissel, France, assignors to Establissements Kuhlmann, Paris, France
No Drawing. Filed June 9, 1964, Ser. No. 373,834
Claims priority, application France, June 11, 1963, 937,700
13 Claims. (Cl. 8—42)

ABSTRACT OF THE DISCLOSURE

Aqueous pastes of metallizable dyestuffs containing essentially water, a water soluble mordant, the metal of which has an atomic number between 24 and 28, inclusive, and a metallizable dyestuff having at least one acid group, the pH of said pastes being below 7 and the particles of which being of a size not greater than 5 microns.

---

The present invention concerns improvements in and relating to new powders and pastes of metallisable dyestuffs.

The dyeing and printing of animal fibres in shades called "fast dyeings" are most often carried out by means of metal complexes of dyestuffs of various groups. The methods of application vary according to the dyestuffs used and according to the nature and form of the fibres.

One of the most important methods of application consists in forming on the fibre the complexes of polyvalent metals and dyestuffs, the metalliferous complexes of which when prepared in substance do not permit the required high qualities of resistance to be attained.

The formation of complexes on the fibre is most often carried out in one of two different ways namely: (1) in two phases, i.e. by dyeing the fibre with non-metallised dyestuffs and subsequent treatment with metallising agent; or (2) by simultaneous application of dyestuff and metallising agent or mordant.

The second method has the advantage of being, in general, quicker and therefore more economical. Its application, however, meets with a variety or difficulties, the first condition of success being the perfecting of suitable compositions containing the dyestuff and the mordant. There are in fact numerous dyestuffs of great value, the solubility of which the dyebaths or in the printing pastes is poor or even nil. It is often necessary to use very considerable quantities of water at high temperature or to make use of chemical means such as, for example, alkaline solution in order to prepare the dyebaths.

An object of the present invention is the provision of compositions, based on dyestuffs and metallic mordants, of special quality and of easy and quick application. Another object is the preparation of such compositions whether in the form of pastes or powders.

According to the present invention therefore aqueous pastes of metallisable dyestuffs are provided containing essentially water, a water-soluble mordant the metal of which has an atomic number between 24 and 28 inclusive, and a metallisable dyestuff having at least one acid group but practically insoluble at room temperature in water at a pH below 7 and selected from the group consisting of the alizarin, triphenlymethane, benzene-azo-benzene, 4-benzene-azo-5 pyrazolone, benzene-azo-hydroxy-quinoline, benzene-azo-acetylacetarylides, benzene-azo-naphthalene, 2-naphthalene-azo-1-hydroxy-naphthalene series and [4-sulpho-2-hydroxy- naphthalene]=<1 azo 1>=[2-hydroxy-naphthalene], the pH of said pastes being below 7 and their particles having a size not greater than 5 microns.

The invention also includes powders of metallisable dyestuffs containing essentially a water-soluble mordant the metal of which has an atomic number between 24 and 28 inclusive, and a metallisable dyestuff having at least one acid group but practically insoluble at room temperature in water at a pH below 7 and selected from the group consisting of the alizarin, triphenlymethane, benzene-azo-benzene, 4-benzene-azo-5 pyrazolone, benzene-azo-hydroxy-quinoline, benzene-azo-acetylacetarylides, benzene-azo-naphthalene, 2 - naphthalene-azo-1-hydroxy-naphthalene series and [4-supho-2-hydroxy-naphthalene]=<1 azo 1>=[2-hydroxy-naphthalene], the particles of the powder having a size not greater than 5 microns.

The invention also includes a process for the preparation of pastes of metallisable dyestuffs which comprises subjecting an aqueous paste containing essentially water, a water-soluble mordant the metal of which has an atomic number between 24 and 28 inclusive, and a metallisable dyestuff having at least one acid group but practically insoluble at room temperature in water at a pH below 7 and selected from the group consisting of the alizarin, triphenylmethane, benzene-azo-benzene, 4-benzene-azo-5 pyrazolone, benzene-azo-hydroxy-quinoline, benzene-azo-acetylacetarylides, benzene-azo-naphthalene, 2-naphthalene-azo-1-hydroxy-naphthalene series and [4-sulpho-2-hydroxy-naphthalene]=<1 azo 1>=[2-hydroxy-naphthalene], to a grinding at a pH below 7, the grinding being continued until particles of size greater than 5 microns have disappeared.

Under these conditions of pH the metal complex of the dyestuff is not formed; it is only formed at the time of the development of the dyeing or printing.

The products thus obtained can be thinned with cold or tepid water and may be used directly in dyeing or printing without the use of steam or of solubilising products. They provide yields which are superior to the usual preparations as well as an excellent evenness of colour, especially in Vigoureux printing and in continuous dyeing.

It is known that numerous metallisable dyestuffs undergo rapid decomposition during dissolution under the action of heat and the present process enables this disadvantage to be avoided.

The metallic mordants which may be used for carrying out the present invention are the salts or complexes of nickel, manganese, cobalt, iron or chromium, with chromium being the most important.

The derivatives of chromium can be used essentially in one of two forms: on one hand, the salts of trivalent chromium such as for example the sulphate, acetate, formate, fluoride, oxalate, succinate, malonate, maleate or glycolate or the complexes such as the chromosalicylates, and on the other hand, the salts of chromic acid such as, for example the alkali metal chromates or dichromates. The latter have the important advantage of reacting more quickly than the former, probably because they liberate nascent chromium oxide during their reduction in the course of the dyeing or printing. On the other hand, their oxidising action is often too great and can damage both the fibre and the dyestucs. In addition, the oxidation reaction liberates alkaline products, the bad effect of which on the animal fibres must be diminished by the addition of acid agents or agents generating acid. This difficulty may be removed by using either the chromates of ammonium or magnesium, or the chromates of chromium. These last products which are described in the literature, are readily available, for example, by the action of chromic acid on hydrated chromium oxide. These chromates of ammonium, magnesium or chromium may in certain cases be used alone, but is often preferable to associate reducing gents with them, among which the chromium salts of organic reducing acids seem to be the most interesting.

Surface-active agents intended to facilitate the dispersion or wetting, organic acids intended to adjust the pH, buffer substances, anti-foaming or anti-dusting agents or any other auxiliary products may also be added to the paste before, during or after the grinding.

The following examples, in which the parts are parts by weight, are purely illustrative and are not intended to limit the scope of the invention.

EXAMPLE 1

A mixture of 42 parts of the dyestuff obtained by coupling the diazo derivative of 1-amino-naphthalene-6-sulphonic acid with salicyclic acid and isolating at pH 2, 73 parts of chromium fluoride with 30% chromium, 2 parts of the condensation product of formaldehyde and naphthalene sulphonic acid in the form of the sodium salt, and 1 part of diheptyl sulphosuccinate in the form of the sodium salt, is kneaded with a quantity of water sufficient to obtain a fluid paste. This paste is ground until all particles of size greater than 2 microns have disappeared, and dried by dispersion in hot air.

The powder obtained is easily dispersed in cold water; this dispersion, applied on worsted fabric, by foularding or by printing followed by steaming, leads to a fast, perfectly even, yellow shade.

EXAMPLE 2

The 42 parts of the dyestuff indicated in Example 1 are replaced by 60 parts of the chromered resulting from coupling the diazo-oxide of 2-nitro-4-methyl-6-aminophenol with 1-p-sulphophenyl-3-methyl-5-pyrazolone, and isolated at pH 2.

The product obtained enables animal fibres to be dyed or printed a fast brick red shade without it being necessary previously to dissolve the dyestuff thinned with water at atmospheric temperature. The dyeings and prints thus obtained are very resistant to all the tests for fastness and are perfectly even.

EXAMPLE 3

45 parts of the orthohydroxyazo dyestuff obtained by coupling the diazo-oxide of 4-chloro-2-aminophenol-6-sulphonic acid with 1-naphthol-4-sulphonic acid, are mixed with 150 parts of water, 2 parts of sodium lignosulphonate, 1 part of diheptyl sulphosuccinate in the form of the sodium salt and 70 parts of chromium fluoride containing 50% of chromium. The fluidised paste is adjusted to pH 3 by the addition of oxalic acid, ground very finely until particles of size greater than 5 microns have disappeared and dried by atomising in hot air.

The powder obtained is suitable for use in dyeing or printing; after making into a paste with cold water it gives a fine dispersion which can be incorporated without previous solution in a printing paste. By application on wool fabric or card followed by steaming, violet prints of very high fastness are obtained.

EXAMPLE 4

65 parts of the dyestuff resulting from coupling the diazo-oxide of 1-amino-2-naphthol-4-sulphonic acid with β-naphthol are made into a paste in 250 parts of water at atmospheric temperature. A solution of 15 parts of sodium dichromate in the minimum of hot water, previously neutralised by the addition of ammonia is added, then a solution of chromium oxalate containing 11 parts of chromium. The paste thus obtained is adjusted to pH 3.5, 1 part of diheptyl sulphosuccinate in the form of the sodium salt is added, and it is ground very finely until particles of size greater than 3 microns have disappeared, then dried by atomisation in hot air.

When applied on wool by foularding or printing, this product gives a navy shade of great fastness to the fulling test and to overdyeing. The shades obtained are brighter than those which are obtained with the same dyestuff previously dissolved in water by means of alkaline agents.

EXAMPLE 5

An aqueous paste containing 67 parts of Chrome Sky Blue (Colour Index, 2nd edition, No. 43,830) isolated at pH 2, 212 parts of chromium fluoride containing 30% of chromium, 2 parts of the condensation product of formaldehyde and naphthalene sulphonic acid in the form of the sodium salt and 1 part of sodium sulphoricinoleate is finely ground until particles of a size greater than 5 microns have disappeared, and dried by dispersion in hot air.

The powder obtained is thinned with cold water, forming a fine dispersion of the insoluble dyestuff; there is no formation of chromium complex of the dyestuff. This dispersion may be applied to any textile form of wool fibres (fabric, felt, worsted, packaged card of thread in hanks or spools). The textile is impregnated with the suspension of the dyestuff and steamed; the dyeing or printing gives a bright blue shade. Application on the same supports, under analogous conditions, of the same dyestuff previously dissolved in alkaline medium, gives shades which are distinctly less bright.

EXAMPLE 6

In Example 4, the sodium dichromate and the chromium oxalate are replaced by 23 parts of a chromium mordant of the following formula:

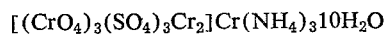

The dyestuff thus obtained is applied by foularding or printing on worsted wool roving. After steaming at 105° C. for 15 minutes, a navy resistant to all the important tests for fastness is obtained. The dyed fibre preserves its handle and its suppleness and lends itself particularly well to spinning.

EXAMPLE 7

115 parts of lizarin Blue-Black B isolated at pH 2 (Colour Index, 2nd Edition, No. 63,615) are mixed with 320 parts of chromium fluoride, 3 parts of the dispersing agent of Example 1 and the amount of water necessary to make the mixture fluid. It is ground in a colloid mill until the particles of size greater than 2 microns have disappeared, and dried by atomisation in hot air.

The product obtained, thinned with cold water, gives with Vigoureux printing intense blacks with high resistance to the current tests for fastness.

The aqueous pastes of the dyestuffs and mordants of the following table, ground possibly in the presence of a wetting or dispersing agent, at a pH below 7, at least until particles having a size greater than 5 microns have disappeared, give on spray drying in hot air powders which disperse easily in water at room temperature, without the addition of solubilising agents or the injection of steam. The dispersions thus obtained may be used directly for the preparation of dye or foularding baths and for the preparation of printing pastes. By comparison with the shades obtained after alkaline solution the shades resulting from the use of the powders or pastes according to the present invention are greatly superior both quantitatively and qualitatively. They are particularly fast to acid over dyeing and to alkaline fulling.

azo-naphthalene, 2 - naphthalene-azo-1-hydroxy-naphthalene series and [4-sulpho-2-hydroxy-naphthalene]=<1

| Examples | Dyestuff | | Metallising agent | Shade |
|---|---|---|---|---|
| | Diazotised base | Coupling component | | |
| 8 | 4-sulpho-1-amino-2-naphthol | 5-sulpho-1-naphthol | Chromium oxalate. | Blue. |
| 9 | do | 8-sulpho-1-naphthol | do | Greenish blue. |
| 10 | 4-sulpho-2-amino-phenol | 1,3-dihydroxybenzene | Chromium fluoride. | Bordeaux. |
| 11 | 4-sulpho-6-nitro-2-amino-phenol | do | do | Bluish Bordeaux. |
| 12 | 6-sulpho-4-chloro-2-amino-phenol | 2,4-dihydroxyquinoline | do | Bordeaux. |
| 13 | 6-sulpho-4-nitro-2-amino-phenol | β-Naphthol | do | Brown. |
| 14 | 6-sulpho-4-nitro-2-amino-phenol | 4-neopentyl-phenol | do | Do. |
| 15 | 6-sulpho-4-chloro-2-amino-phenol | 8-acetylamino-2-naphthol | Chromium oxalate. | Grey. |
| 16 | 4-sulpho-6-chloro-2-amino-phenol | do | do | Do. |
| 17 | 6-sulpho-4-nitro-2-amino-phenol | Acetylacetanilide | Chromium fluoride. | Yellow. |
| 18 | Anthranilic acid | 4'-sulpho-1-phenyl-3-methyl-5-pyrazolone | Chromium oxalate. | Do. |
| 19 | 4-phenylamino-sulphonyl-1-amino-benzene-2,2'-dicarboxylic acid | 1-phenyl-3-methyl-5-pyrazolone | do | Do. |
| 20 | 4-sulpho-6-nitro-1-amino-phenol | β-Naphthol | do | Black. |
| 21 | 4-sulpho-1-amino-2-naphthol | α-Naphthol | do | Marine. |
| 22 | 4-sulpho-6-nitro-1-amino-2-naphthol | do | do | Black. |
| 23 | 6-sulpho-4-nitro-2-amino-phenol | 1-phenyl-3-methyl-5-pyrazolone | Chromium fluoride. | Orange. |
| 24 | 4-nitro-2-amino-phenol | 4'-sulpho-1-phenyl-3-methyl-5-pyrazolone | do | Do. |
| 25 | 6-chloro-4-nitro-2-amino-phenol | do | do | Do. |
| 26 | 4-sulpho-6-nitro-2-amino-phenol | 2,4-dihydroxyquinoline | Chromium oxalate. | Red. |
| 27 | 6-nitro-4-methyl-2-amino-phenol | 4'-sulpho-1-phenyl-3-methyl-5-pyrazolone | do | Red. |
| 28 | 6-sulpho-4-chloro-2-amino-phenol | 3'-sulpho-6'-chloro-1-phenyl-3-methyl-5-pyrazolone | Chromium fluoride. | Red. |
| 29 | do | 3'-sulpho-1-phenyl-3-methyl-5-pyrazolone | do | Red. |
| 30 | 4-sulpho-1-amino-2-naphthol | 1-phenyl-3-methyl-5-pyrazolone | Chromium oxalate. | Red. |
| 31 | do | 4'-sulpho-1-phenyl-3-methyl-5-pyrazolone | do | Red. |
| 32 | 4-nitro-6-chloro-2-amino-phenol | 5-sulpho-1-naphthol | Chromium fluoride. | Violet. |
| 33 | 3'-sulpho-4'-chloro-5-hydroxy-4-amino-2-methylbenzene-azo-benzene. | β-Naphthol | Chromium malonate. | Green. |

We claim:

1. Aqueous pastes of metallisable dyestuffs containing essentially water, a water-soluble mordant the metal of which has an atomic number between 24 and 28 inclusive, and a metallisable dyestuff having at least one acid group but practically insoluble at room temperature in water at a pH below 7 and selected from the group consisting of the alizarin, triphenylmethane, benzene-azo-benzene, 4-benzene-azo-5 pyrazolone, benzene-azo-hydroxy-quinoline, benzene-azo-acetylacetarylides, benzene-azo-naphthalene, 2-naphthalene-azo - 1 - hydroxynaphthalene series and [sulpho-2-hydroxy-naphthalene]=<1 azo 1>=[2-hydroxy-naphthalene], the pH of said pastes being below 7 and their particles having a size not greater than 5 microns.

2. Aqueous pastes as claimed in claim 1 in which the mordant is a water-soluble chromium mordant.

3. Aqueous pastes as claimed in claim 1 in which the mordant is a water-soluble salt of chromic acid.

4. Aqueous pastes as claimed in claim 1 in which the mordant is a member selected from the group consisting of the water-soluble chromates of ammonium, magnesium and chromium.

5. Aqueous pastes as claimed in claim 4 in which there is also present a reducing agent.

6. Aqueous pastes as claimed in claim 5 in which the reducing agent is a chromium salt of an organic reducing acid.

7. Process for the preparation of pastes of metallisable dyestuffs which comprises subjecting an aqueous paste containing essentially water, a water-soluble mordant the metal of which has an atomic number between 24 and 28 inclusive, and a metallisable dyestuff having at least one acid group but practically insoluble at room temperature in water at a pH below 7 and selected from the group consisting of the alizarin, triphenylmethane, benzene-azo-benzene, 4-benzene-azo-5 pyrazolone, benzene-azo-hydroxy-quinoline, benzene-azo-acetylacetarylides, benzene-azo-naphthalene, 2 - naphthalene-azo-1-hydroxy-naphthalene series and [4-sulpho-2-hydroxy-naphthalene]=<1 azo 1>=[2-hydroxy-naphthalene], to grinding at a pH below 7, the grinding being continued until particles of size greater than 5 microns have disappeared.

8. Process as claimed in claim 7 in which the mordant is a water-soluble chromium mordant.

9. Process as claimed in claim 7, in which the grinding is effected in the presence of a dispersing agent.

10. Process as claimed in claim 7 in which the product obtained is dried to a powder.

11. Process as claimed in claim 7 in which the product obtained is spray-dried.

12. Process for the preparation of powders of metallisable dyestuffs which comprises subjecting an aqueous paste containing essentially water, a water-soluble mordant the metal of which has an atomic number between 24 and 28 inclusive, and a metallisable dyestuff having at least one acid group but practically insoluble at room temperature in water at a pH below 7 and selected from the group consisting of the alizarin, triphenylmethane benzene-azo-benzene, 4-benzene-azo-5 pyrazolone, benzene-azo-hydroxy - quinoline, benzene-azo-acetylacetarylides, benzene-azo-naphthalene, 2-naphthalene-azo-1-hydroxy-naphthalene series and [4-sulpho-2-hydroxy-naphthalene]=<1 azo 1>=[2 - hydroxy - naphthalene], to grinding at a pH below 7, the grinding being continued until particles of size greater than 5 microns have disappeared and subjecting the paste thus obtained to spray-drying.

13. Powders of metallisable dyestuffs containing essentially a water-soluble mordant the metal of which has an atomic number 24 and 28 inclusive, and a metallisable dyestuff having at least one acid group but practically insoluble at room temperature in water at a pH below 7 and selected from the group consisting of the alizarin, triphenylmethane, benzene-azo-benzene, 4-benzene-azo-5 pyrazolone, benzene-azo-hydroxy-quinoline, benzene-azo-acetylacetarylides, benzene-azo-naphthalene, 2-naphthalene-azo-1-hydroxynaphthalene series and [4-sulpho-2- hydroxy-naphthalene]=<1 azo 1>=[2-hydroxy-naphthalene], the particles of the powder having a size not greater than 5 microns.

References Cited

UNITED STATES PATENTS

| | | | |
|---|---|---|---|
| 3,120,508 | 2/1964 | Braun et al. | 260—208 X |
| 3,261,823 | 7/1966 | Kuhne et al. | 260—149 |

FOREIGN PATENTS

| | | |
|---|---|---|
| 639,080 | 3/1962 | Canada. |

OTHER REFERENCES

J. E. Lynn et al.: Advances in Textile Processing, vol. 1, pp. 340–342, published by Textile Book Publishers, Inc., New York, 1961.

NORMAN G. TORCHIN, *Primary Examiner.*

T. J. HERBERT, JR., *Assistant Examiner.*

U.S. Cl. X.R.

8—71